(12) United States Patent
Lin et al.

(10) Patent No.: US 10,089,680 B2
(45) Date of Patent: Oct. 2, 2018

(54) AUTOMATICALLY FITTING A WEARABLE OBJECT

(71) Applicant: EXCALIBUR IP, LLC, New York, NY (US)

(72) Inventors: Shih-Chiang Lin, Taipei (TW); Shu-Fang Hsiao, Taipei (TW)

(73) Assignee: EXALIBUR IP, LLC, New York, NY (US)

( * ) Notice: Subject to any disclaimer, the term of this patent is extended or adjusted under 35 U.S.C. 154(b) by 332 days.

(21) Appl. No.: 13/796,757

(22) Filed: Mar. 12, 2013

(65) Prior Publication Data
US 2014/0282137 A1    Sep. 18, 2014

(51) Int. Cl.
*G06F 3/0484* (2013.01)
*G06Q 30/06* (2012.01)

(52) U.S. Cl.
CPC ................ *G06Q 30/0643* (2013.01)

(58) Field of Classification Search
CPC ......... G06F 17/30864; G06F 17/30286; G06F 17/00; G06F 9/4443; G06F 3/00; G06F 3/048; G06F 3/0481; G06F 3/0482; G06F 3/04815; G06F 3/04817; G06F 3/04883; G06F 8/34; G06F 9/44543; G06Q 30/0641; G06Q 30/0643; G06Q 30/0601; G06Q 30/0603; G06T 19/00; G06T 11/60; G06T 11/40; H04N 21/4622; H04L 29/06; H04L 29/0809; G11B 27/34
See application file for complete search history.

(56) References Cited

U.S. PATENT DOCUMENTS

| | | | | |
|---|---|---|---|---|
| 5,530,652 A * | 6/1996 | Croyle | ............ | A41H 1/02 356/394 |
| 5,680,528 A * | 10/1997 | Korszun | ............ | 345/630 |
| 5,937,081 A * | 8/1999 | O'Brill et al. | ............ | 382/111 |
| 7,328,119 B1 * | 2/2008 | Pryor | ............ | A63B 71/06 128/920 |
| 8,275,590 B2 * | 9/2012 | Szymczyk | ............ | G06Q 30/0603 345/418 |
| 8,908,928 B1 * | 12/2014 | Hansen | ............ | 382/111 |
| 8,976,230 B1 * | 3/2015 | Vendrow | ............ | 348/46 |
| 2001/0026272 A1 * | 10/2001 | Feld | ............ | A41H 3/007 345/419 |
| 2002/0004763 A1 * | 1/2002 | Lam | ............ | G06F 1/26 705/26.44 |
| 2004/0049309 A1 * | 3/2004 | Gardner | ............ | A41H 1/00 700/132 |

(Continued)

OTHER PUBLICATIONS

Virtual Fitting Room—Fitting Reality; Cloud-based Augmented Reality Fitting Room; © Fitting Reality, 2013 <<http://fittingreality.com/>> Retrieved Mar. 12, 2013, 2 pgs.

(Continued)

*Primary Examiner* — Xiomar L Bautista
(74) *Attorney, Agent, or Firm* — James J. DeCarlo; Greenberg Traurig, LLP

(57) ABSTRACT

Image of a subject is received along with viewable representations of a user selected wearable object having a respective size indicative of physical dimensions of the wearable object. The physical proportions of the subject are determined and a display is generated that shows how the wearable object having a respective size will look when worn by the subject having the determined physical proportions.

14 Claims, 9 Drawing Sheets

(56) References Cited

U.S. PATENT DOCUMENTS

| | | | |
|---|---|---|---|
| 2005/0067420 A1* | 3/2005 | Diaz | A43D 117/00 |
| | | | 221/2 |
| 2006/0149638 A1* | 7/2006 | Allen | 705/26 |
| 2009/0144173 A1* | 6/2009 | Mo | G06N 3/006 |
| | | | 705/26.1 |
| 2009/0287650 A1* | 11/2009 | Cha | G06F 17/30749 |
| 2010/0214442 A1* | 8/2010 | Uemura et al. | 348/231.2 |
| 2010/0241963 A1* | 9/2010 | Kulis | G06F 3/167 |
| | | | 715/727 |
| 2011/0246329 A1* | 10/2011 | Geisner et al. | 705/27.1 |
| 2011/0288850 A1* | 11/2011 | Shen | G06F 3/038 |
| | | | 704/2 |
| 2012/0127199 A1* | 5/2012 | Aarabi | 345/629 |
| 2013/0083065 A1* | 4/2013 | Schulze | 345/633 |
| 2013/0086105 A1* | 4/2013 | Hammontree | G06F 17/30864 |
| | | | 707/769 |
| 2013/0108121 A1* | 5/2013 | de Jong | 382/111 |
| 2013/0179288 A1* | 7/2013 | Moses et al. | 705/26.1 |
| 2013/0215116 A1* | 8/2013 | Siddique et al. | 345/420 |
| 2013/0229482 A1* | 9/2013 | Vilcovsky et al. | 348/14.07 |
| 2013/0254648 A1* | 9/2013 | Amacker | G06F 3/017 |
| | | | 715/234 |
| 2014/0010449 A1* | 1/2014 | Haaramo et al. | 382/173 |
| 2014/0035913 A1* | 2/2014 | Higgins et al. | 345/420 |
| 2014/0063056 A1* | 3/2014 | Zhong | 345/633 |
| 2014/0176565 A1* | 6/2014 | Adeyoola | G06T 13/80 |
| | | | 345/473 |
| 2014/0180864 A1* | 6/2014 | Orlov | G06Q 30/0631 |
| | | | 705/26.7 |
| 2014/0201023 A1* | 7/2014 | Tang | 705/26.5 |
| 2015/0003690 A1* | 1/2015 | Masuko et al. | 382/111 |
| 2015/0154453 A1* | 6/2015 | Wilf | G06K 9/00711 |
| | | | 382/103 |

OTHER PUBLICATIONS

3D Virtual fitting dressing room / mirror; Fitnect; Virtual mirror, shopping window, virtual store, and much more. . . ; Fitnect Interactive © 2012 <<http://www.fitnect.hu/>> Retrieved Mar. 12, 2013, 2 pgs.

* cited by examiner

AUTOMATICALLY FITTING A WEARABLE OBJECT

BACKGROUND

The development of Internet not only lead to the age of information but also heralded the development of eCommerce which facilitates purchase of goods without having to visit the brick and mortar store of a vendor. Among the various kinds of goods sold online, consumer electronics, books, music, appliances, home furnishings, office supplies and the like are popular. Besides the convenience of being able to make the purchase from a remote location any time of the day or week, improved imaging techniques have facilitated users to take a closer look at the quality of the goods prior to purchasing and hence, have lead to greater online sales.

SUMMARY

This disclosure facilitates users to determine how a selected wearable object such as an item of clothing or an accessory will fit a subject based on the subject's physical proportions and a size of the wearable object.

A processor-executable method of displaying to a user how a selected wearable object will appear when worn by a subject is disclosed. The method comprises receiving by a processor, a first image of a subject and determining the proportions of the subject's body by the processor. In an embodiment, the first image is retrieved by the processor from a processor readable storage medium. In an embodiment, the first image is received by the processor in real-time from an imaging device.

Information regarding a plurality of wearable objects is transmitted by the processor for display to the user to facilitate user selection of a wearable object. Each of the wearable objects has a respective size indicative of respective physical dimensions. A user selection of a wearable object from a plurality of wearable objects is also received by the processor. A graphical representation of the wearable object having a predetermined size corresponding to the physical dimensions of the wearable object is retrieved and a second image that shows the user selected wearable object on the subject's body in accordance with the proportions of the subject's body and the physical dimensions of the wearable object is generated by the processor by combining the first image with the graphical representation. The second image is transmitted for display to the user. In an embodiment, a voice command is received by the processor from the user and the voice command is decoded to generate the second image.

In an embodiment, the processor selects the predetermined size as an optimum size for the subject based on the proportions of the subject's body from a plurality of sizes that comprise the predetermined size and other sizes alternately available for the wearable object. In an embodiment, the optimum size is selected by the processor by comparing, the proportions of the subject's body with metadata associated with the plurality of sizes and selecting from the plurality of sizes, a size that has respective metadata with measurement ranges including the proportions as the optimum size.

In an embodiment, the predetermined size is selected by the user.

In an embodiment, a request is received by the processor to determine an optimum size of user selected wearable object for the subject in the image. Metadata associated with a plurality of sizes that define respective dimensions available for the user selected wearable object is accessed and compared by the processor with the proportions of the subject for determining the optimum size.

In an embodiment, the processor can select from the plurality of sizes, a size different from the predetermined size of the user selected wearable object as the optimum size. A third image is generated by the processor that shows the selected wearable object of the optimum size on the subject's body in accordance with the proportions of the subject's body and the physical dimensions of the selected wearable object by combining the first image with the graphical representation of the wearable selected object having the optimum size. The third image is transmitted for display to the user.

A computing device comprising a processor and a storage medium for tangibly storing thereon program logic for execution by the processor for displaying to a user the fit of a selected wearable object is disclosed in an embodiment. The program logic that is executed by the processor comprises image receiving logic for receiving a first image of a subject, determining logic for determining proportions of the subject's body, selected wearable objects receiving logic for receiving a user selection of a wearable object from a plurality of wearable objects, each of the wearable objects having a size indicative of respective physical dimensions. Wearable objects transmitting logic is executed by the processor, for transmitting information regarding the plurality of wearable objects for display to the user to facilitate the user selection and graphical representation retrieving logic is executed for retrieving a graphical representation of the wearable object having a predetermined size corresponding to respective physical dimensions. A second image that shows the wearable object on the subject's body in accordance with the proportions of the subject's body and the predetermined size of the wearable object by combining the first image with the graphical representation of the wearable object is generated by the image generating logic while image transmitting logic is executed by the processor, for transmitting the second image for display to the user.

In an embodiment, size selecting logic, is executed by the processor for selecting the predetermined size as an optimum size for the subject, the optimum size is selected based on the proportions of the subject's body from a plurality of sizes that comprise the predetermined size and other sizes alternately available for the wearable object. The size selecting further comprises comparing logic for comparing the proportions of the subject's body with metadata associated with the plurality of sizes.

A computer readable storage medium, comprising instructions, which when executed by a processor cause the processor to receive a first image of a subject and a user selection of a wearable object from a plurality of wearable objects, determine proportions of the subject's body, retrieve a graphical representation of the wearable object, generate, a second image that shows the user selected wearable object on the subject's body in accordance with the proportions of the subject's body and the physical dimensions of the wearable object by combining the first image with the graphical representation and transmit the second image for display to the user.

In an embodiment, the processor further selects the predetermined size as an optimum size for the subject based on the proportions of the subject's body from a plurality of sizes that comprise the predetermined size and other sizes alternately available for the wearable object. The proportions of the subject's body is compared with metadata associated with the plurality of sizes to select from the plurality of sizes, a size that has respective metadata with measurement ranges including the proportions as the optimum size.

These and other embodiments/will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
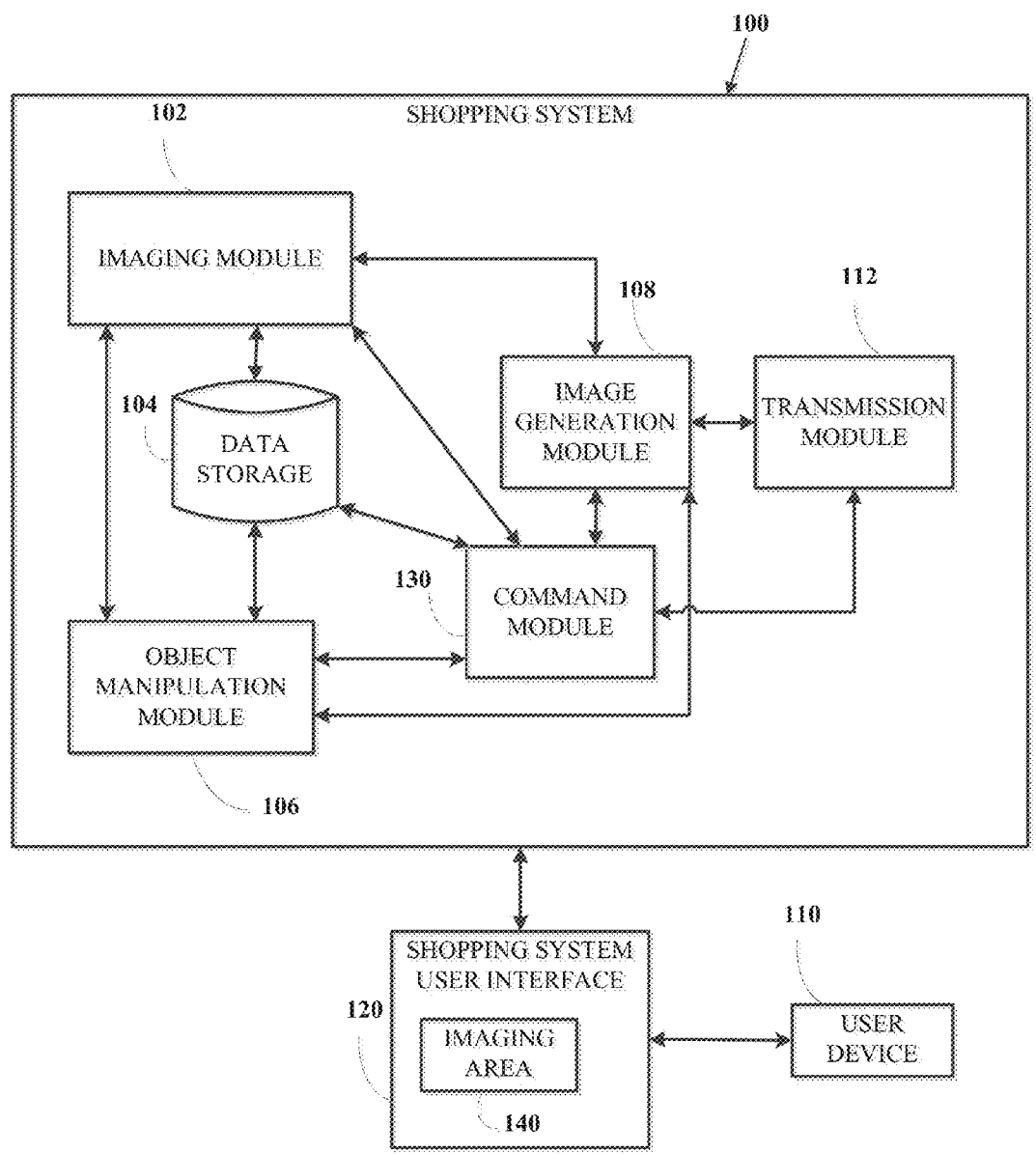
FIG. 1 shows a shopping system for generating an image that facilitates online shopping by displaying how a particular selected object would look on a user pictured in an image in accordance with an embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The advent of the Internet and subsequent development of eCommerce websites has led users to be able to shop for any desired item round the clock on any given day of the week. Accordingly, some online retailers have grown larger than some brick and mortar shops. In fact, in some categories of goods, such as, electronics or content such as books, music, movies etc. online vendors can provide instant wish fulfillment to users and hence for these categories, online vendors have actually overtaken physical stores in terms of sales.

However, there are some categories of goods, such as, apparel or accessories, where shoppers might prefer visiting a physical store when compared to online shopping. This is because, a shopper might prefer to feel the fabric of a garment along with checking out how the garment fits/suits him or her prior to purchasing it. As a result shoppers have to contend with the inconveniences attendant with physical stores when purchasing such items. Recent developments in imaging have resulted in better presentation of garments online so that shopping websites can magnify a garment and enable users to closely examine its fabric as they would in a physical store. There are websites that show models wearing garments and accessories to give a better idea to users regarding their potential purchases. In addition, shoppers may be able to purchase apparel/accessories online because of standardized sizes and knowledge of colors that suit them. However, this requires shoppers to use their imagination in order to determine how a particular garment will look when worn by a particular user and hence it may not fully mitigate the need to visit a physical store in order to try on the garment.

Embodiments described herein facilitate users shopping online for apparel or accessories to get a better idea of how they would look when worn by themselves or even others for whom they may wish to purchase an item. Systems and methods described herein facilitate users to upload images and select particular items such as an item of clothing or accessory and receive a graphic representation that shows how the selected item looks when worn by a user whose image was received. If the selected garment is too large or too small, the user can request the system to automatically fit the garment and thereby determine the right size for the user.

Turning now to the figures, FIG. 1 shows a shopping system 100 that facilitates online shopping by displaying how a particular selected object would look on a user pictured in an image. The shopping system 100 has associated therewith a user interface 120 which can be accessed by users via, for example, a user device 110. Any portable, mobile or even a tethered/stationary device can be used to access the user interface 120, such as a webpage of an eCommerce website associated with the shopping system 100. Various embodiments detailed herein facilitate a shopper to upload or otherwise access an image, select a wearable object and generate a graphical representation of a user in the image wearing the selected wearable object. The shopping system 100 therefore, facilitates remote shoppers to try out different wearable objects prior to purchase. This mitigates the need for shoppers to visit physical locations of vendors in order to try out different wearable objects or items.

In an embodiment, the shopping system 100 comprises an imaging module 102 that receives images uploaded by users. In an embodiment, the imaging module 102 receives a moving image or a video of a subject rather than a stationary image in order to determine depth of the image and hence to more accurately assess the various body proportions of the subject in the image. In an embodiment, the users can upload their own images or images of other users or subjects either in real-time, for example, by capturing their images via cameras in mobile/stationary devices, such as user device 110 or they can provide an image pre-stored in a processor-readable data storage device such as data storage 104 that is accessible to the imaging module 102. A shopper employing the shopping system 100 can thereby also shop for others and make purchases for other users after judging how particular wearable objects would appear when worn by others for whom they are shopping. In an embodiment, the user device 110 can be a mobile device such as a smart phone, a tablet device or a laptop computer and the image received in real-time can be a photograph or a video clip obtained from an imaging component such as a camera of the mobile device. In an embodiment, the user device 110 can be an imaging arrangement located in a physical store that a shopper is visiting as detailed further infra. The shopper can stand within the field of view of the arrangement and access the website of the store to see how different items fit them without having to actually try them on.

In an embodiment, a previously stored image can be retrieved from a local storage of the user device 110 and transmitted to the imaging module 102 by the mobile device 110 or it can be directly retrieved by the imaging module 102 from the storage 104 associated with the shopping system 100 based on a user selection from the user device 110. For example, if a user is shopping for another user who is also a client or a member of the shopping system 100, an image of the other user can be stored on the storage 104 associated with the shopping system 100 and based on the permissions set by the other user, the shopper can access the image and purchase particular wearable objects based on how they would look if worn by the other user.

An object manipulation module 106 along with the command module 130 are included in the shopping system 100 facilitates user manipulation of wearable objects presented by the shopping system 100 on the user interface 120. In an embodiment, graphical representations of a plurality of wearable objects or items such as, clothing, jewelry, or other accessories such as handbags, shoes, hats, gloves can be retrieved from the data storage 104 and presented to the user on the shopping system user interface 120. The object manipulation module 106 in conjunction with the command module 130 facilitates user interaction with the objects in the shopping system 100 via various modalities. The user interactions with different wearable objects can comprise, receiving user input that indicates user selection, de-selection of a particular wearable object, automatic fitting of a wearable object, locking to a selected size or other behavior as the user navigates the user interface 120. In an embodiment, the object manipulation module 106 facilitates proper fitting of wearable objects such as, garments to suit the proportions of the user in the received image. Based on the extent to which the user appears in the received image and based on the depth information, the object manipulation module 106 can be configured to determine height, waist width and other proportions of the user in the received image. The proportion information can be further employed to automatically fit wearable objects such as garments to the received image so that a shopper is able to see how the garment if selected in the correct size would look on the user. This process can occur via further input from the shopper in accordance with embodiments detailed further infra.

In an embodiment, the command module 130 can decode/interpret user input received via gestures such as movement of the user's limbs that map to specified areas of a user interface 120. In an embodiment, the command module 130 can obtain user input for manipulating objects via a mouse click, keyboard, tap, swipe, a scanned bar code or other gesture based on the type of device being employed by the user to access the user interface 110. In an embodiment, the command module 130 can also be configured to receive voice commands to facilitate execution of particular tasks based on the user intent conveyed in the voice commands. The command module 130 is thus communicatively coupled to the other modules of the shopping system 100 to facilitate execution of various tasks based on user input received via different modalities.

The image generation module 108 also included in the shopping system 100 obtains the user's image from the imaging module 102 and information related to manipulating an object from the object manipulation module 106 and generates a graphical representation that combines the received user's image with the wearable object in accordance with the manipulation information transmitted by the object manipulation module 106. In an embodiment, the user interface 120 can present instructions to the user to load the image such that the user in the image is centered in an imaging area 140 so that the image generation module 108 can generate the combined image by detecting the user in the imaging area or dressing room 140 and overlaying the selected wearable object on the user image in the imaging area 140.

In an embodiment, the selected object is obtained from the object manipulation module 106, if the manipulation information indicates a shopper selection of a particular wearable object, the image generation module 108 generates an image that shows the wearable object fitted to the body of the user pictured in a received image. If the manipulation information indicates a shopper de-selecting a previously selected wearable object or requesting an automatic fit of a selected garment, the image generation module 108 generates another image that reflects such shopper input in the generated image. In an embodiment, the user/shopper input can indicate selection of a next item. In this case, a display screen showing the combined image to the shopper can be refreshed to show another image showing the default next selection fitted to the received image. In an embodiment, the shopping system 100 automatically fits an optimum sized wearable item based on the proportions of a subject in a received image. The object manipulation module 106 obtains the proportion of the subject in the imaging area 140, automatically selects appropriately sized wearable object and transmits the image/three dimensional model of the selected wearable object to the image generation module 108 for generation of the combined image. In an embodiment the shopper can be permitted to set a particular size in case automatic fitting by the shopping system 100 is not desired.

The transmission module 112 transmits such generated images to the user interface 120 which in turn is displayed on a display screen associated with the user device 110. Therefore, the shopping system 100 facilitates shoppers to judge how different wearable items such as apparel and accessories would suit them or others without actually having to visit the physical outlets to try out the various wearable items. This not enhances the convenience of an eCommerce website by mitigating the problems that are usually faced by users when shopping online for such items like clothing or accessories but also mitigates the need for shoppers to try on different items in a physical store.

Figure 2:
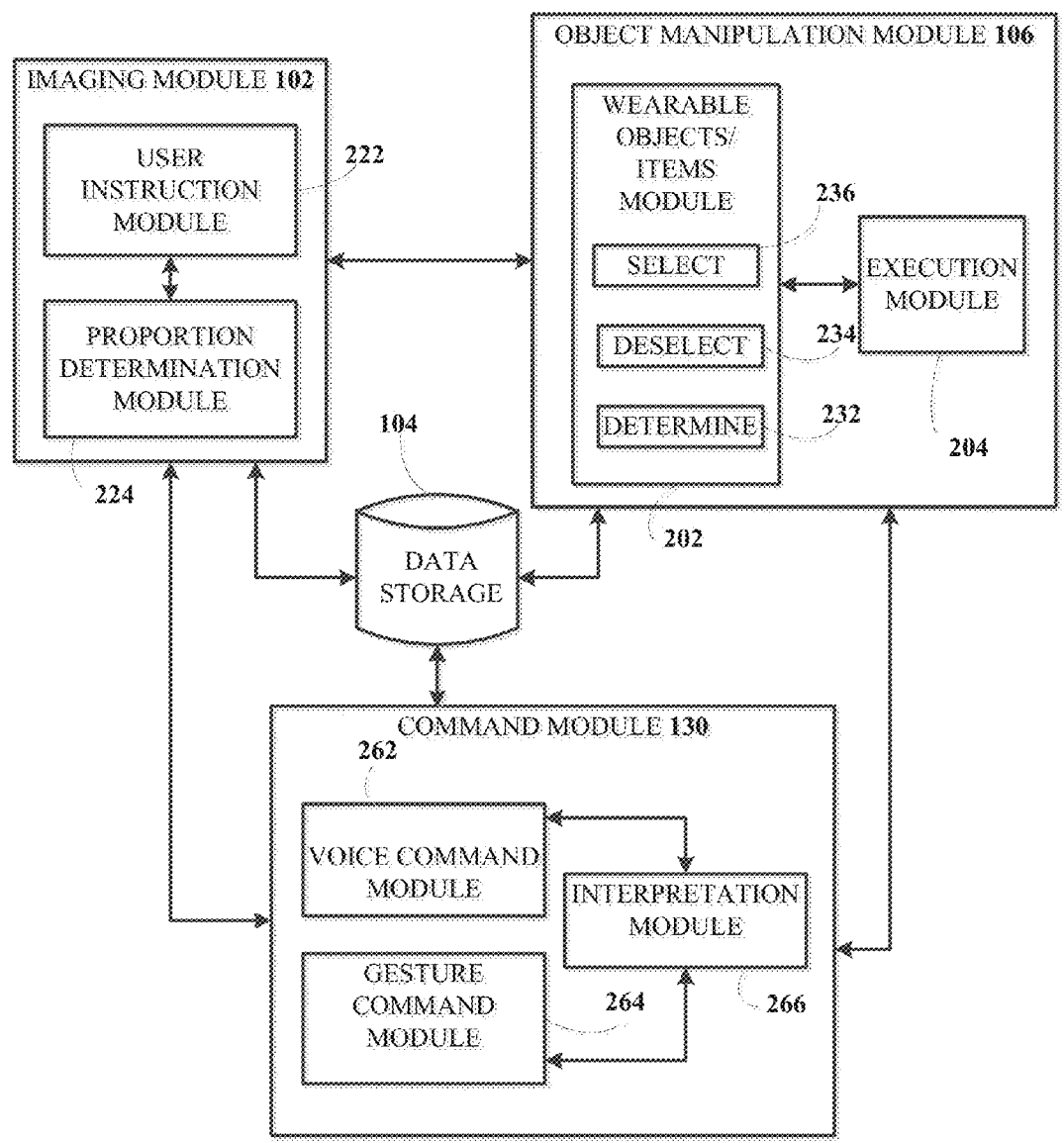
FIG. 2 is a schematic diagram showing further details of the interactions between the imaging module, the object manipulation module and the command module in accordance with an embodiment.

FIG. 2 is a schematic diagram showing further details of the interactions between the imaging module 102, the object manipulation module 106 and the command module 130 in accordance with an embodiment. The object manipulation module 106 facilitates user interaction with various wearable objects that the shopping system 100 makes available to shoppers. In an embodiment, the object manipulation module 106 can also facilitate shoppers to retrieve information to verify fit of wearable objects they find in the physical stores without having to actually wear the objects/items. The object manipulation module 106 comprises a wearable objects module 202 that receives information related to various wearable objects that are available to shoppers. In an embodiment, the information received by the wearable objects module 202 comprises graphical representations such as images of the wearable objects that can be visually perceived by shoppers on the user interface 120. For example, the graphical representation can comprise a three-dimensional model of a garment generated by a graphics program rather than a two-dimensional image obtained from a camera. When combined with the user images, such as videos received by the shopping system 100, the three-dimensional models can generate superior graphics that deliver more realistic representations regarding the fit of the garments to shoppers as compared to a simple overlay of two or more two-dimensional images. The information received by the wearable items module 202 is conveyed to the execution module 204 that executes appropriate commands on a set of wearable items based on user input as will be detailed further herein.

The command module 130 is configured to receive and interpret user input for manipulation of the wearable objects. Various types of user input via voice or gestures can be received. The voice command module 262 receives a shopper's voice input, decodes the voice input to determine the command associated therewith and transmits the command to the interpretation module 266 which can interpret or map the voice command to a particular task that the shopping system 100 should execute in response to the received voice command. For example, the shopping system 100 can comprise some pre-defined voice commands that are mapped to particular actions executed by the shopping system 100 and the shoppers can be educated via voice or visual prompts on the user interface 120 as they interact with the shopping system 100. Any known voice based command interface can be incorporated into the shopping system 100 to implement the voice command module 262.

The command module 130 also includes a gesture command module 264 that receives user gestures and decodes them to identify the command associated therewith. The command thus identified is transmitted to the interpretation module 266 which determines the action that should be executed by the shopping system 100 in response to the shopper's command. The user input received via gestures can depend on the type of user device 110 that is being employed by the shopper to provide the input. For example, if the shopper employs a user device 110 in a physical store or home to access a website of a merchant, the user interface 120 accessed by the shopper can be a perceptual user interface (PUI) and the input provided can be via gestures such as moving hands to particular areas of the user interface 120 or in a particular direction, facial gestures or eye tracking. If the shopper employs a user device 110 such as a laptop or a desktop computer to access the user interface 120, the user input can be received via input devices such as mouse, keypad, joysticks or even voice or facial gestures based on the laptop/desktop equipment that can be accessed by the shopping system 100. If the shopper employs a user device 110 such as a tablet or a smartphone to access the user interface 110, gestures such as swiping, tapping, tilting the tablet can also be incorporated or mapped to particular actions or tasks that the shopping system 100 should execute in response to such input. In an embodiment, the shopper can employ a bar code scanner to scan a bar code associated with a particular wearable item. The gesture command module 264 can be configured to interpret such input as a selection of the wearable item associated with the bar code. Information regarding the corresponding wearable item can be retrieved and presented on a user interface 120 in accordance with embodiments described herein.

Thus, the interpretation module 266 is configured to interpret or map various kinds of user input that is received via a plurality of user devices in different modalities to particular actions or tasks that are to be executed in response by the shopping system 100. In an embodiment, various versions of the user interface 120 can be served to the shopper by the shopping system 100 based on the type of user device 110 employed by the shopper to access the shopping system 100.

The execution module 204 receives the wearable object data from the wearable objects module 202 and information regarding a particular action or a particular way in which the wearable object data should be manipulated from the interpretation module 266 and manipulates the data accordingly to generate a result desired or intended by the shopper. For example, the execution module 204 can receive data from the wearable objects module 202 regarding t-shirts of different colors presented to the shopper by the shopping system 100 and also data from the interpretation module 266 regarding input that conveys a desire of the shopper to try on a red t-shirt. The execution module 204 can manipulate the wearable object data to select the red t-shirt from the different t-shirts for further transmission to the image generation module 108. Similarly, the shopper may subsequently provide different inputs that indicate the shopper's desire to try on another t-shirt, to exit or log off from the shopping system 100, select another category of wearable objects or even select another image which inputs are interpreted by the command module 130 to execute appropriate actions.

In an embodiment, the shopping system 100 further facilitates automatic fitting of garments to users in images. The imaging module 102 can include a user instruction module 222 that can instruct a shopper regarding the image to be uploaded or received by the imaging module 102 based on a selected wearable object if a received image is not appropriate to fit the selected wearable object. For example, the user instruction module 222 can instruct the shopper to be at a certain position from an imaging component of the user device 110 so that an optimum part of the body such as a torso or a full body image can be seen on the imaging area 140 in the user interface 120. In case of a pre-stored image that is retrieved from the data store 104, such image can be automatically placed in an optimum position within the imaging area 140 that shows the fit of a selected wearable object.

In an embodiment, the imaging module 102 also comprises a proportion determination module 224 that is configured to determine proportions of an subject featured in the image comprising depth information. The proportion determination module 224 can determine appropriate proportions for automatic fitting of selected wearable objects. Thus, if the entity is a full body image of a human user, the proportion determination module 224 can determine proportions such as height, waist, length of the limbs, width of the shoulders and other proportions. If the subject is a torso of a human user, the proportion determination module 224 can determine just the width of the chest and the length of torso. The proportion determination module 224 can thus be configured to determine various sets of proportions based on the entity identified in the received image. In an embodiment, the proportion information can be stored along with the received image in the data store 104 so that it can be accessed when desired by the shopper. In an embodiment, the proportion determination module 224 can be configured to determine the subject or entity featured in a received image via image metadata such as, tags associated with the received image.

Information from the proportion determination module 224 can be transmitted to the wearable objects module 202. In an embodiment, based on the shopper's request, the wearable objects module 202 can determine the appropriate size of a selected wearable object based on the proportion information received from the proportion determination module 224 and present it to the shopper. For example, when the shopper uploads an image with depth information and selects a particular garment or accessory that is available in different sizes, the proportion information can be received by the wearable objects module 202 which can then determine 232 the size of the selected wearable object that would fit the proportions conveyed by the proportion information and automatically select 236 the size for purchase by the shopper. In an embodiment, the three dimensional models of the wearable objects can have the proportion information associated therewith as metadata. Hence, the appropriate size can be determined by comparing the received proportion information with the metadata of the three dimensional models to automatically determine the correct size. This facilitates personalization of the shopping system 100 enabling the users or clients to better judge the wearable objects such as garments or accessories that flatter their body structure as compared to a simple superimposition of images or three dimensional models on videos that result in rather awkward images which fail to picture accurately convey how a given wearable object will suit a body of specified dimensions or the size of a wearable object that would be an optimal fit for a particular subject.

Figure 3:
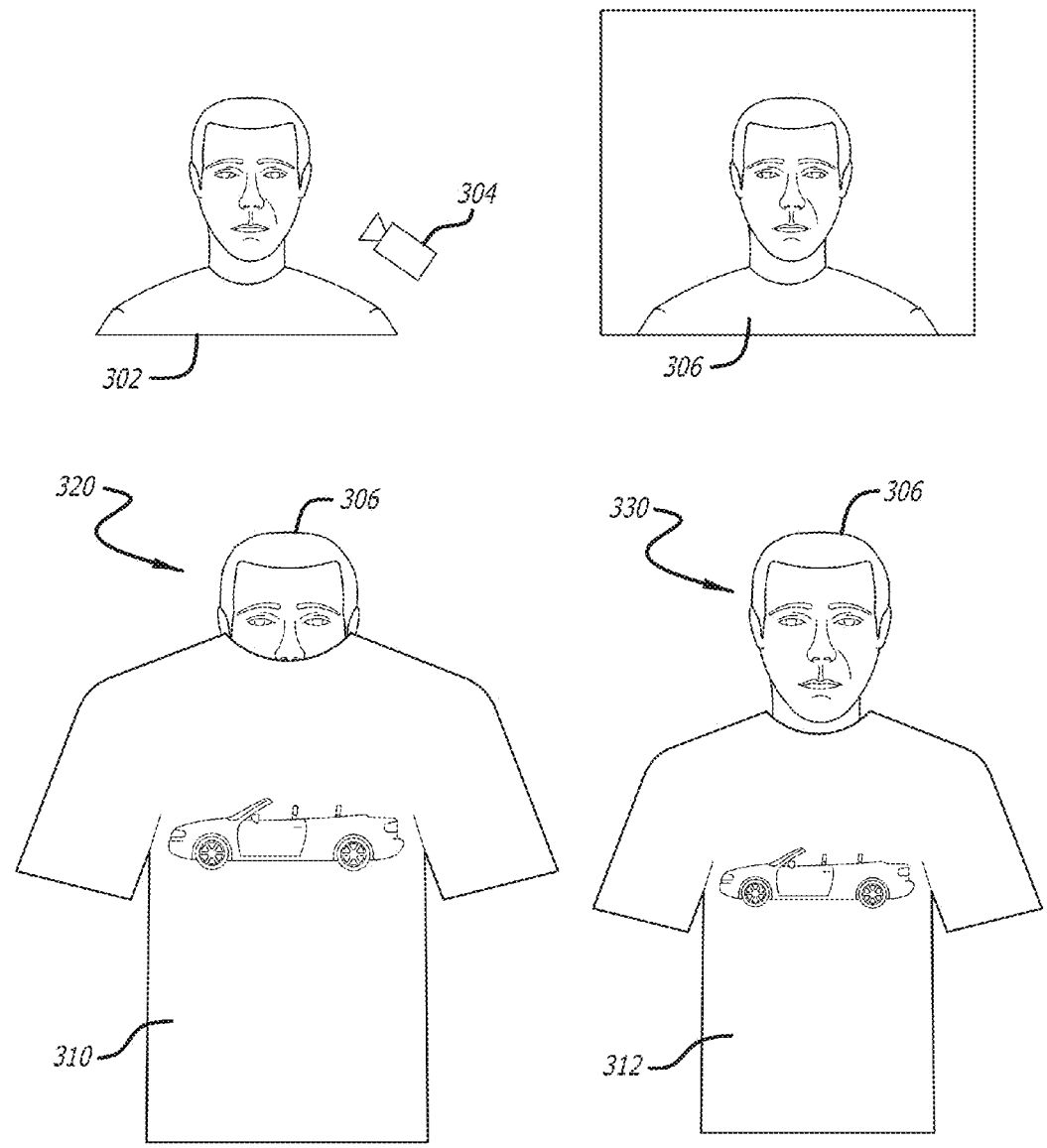
FIG. 3 is a schematic diagram showing a shopping experience as implemented in accordance with an embodiment.

FIG. 3 is a schematic diagram showing a shopping experience as implemented in accordance with capturing a shopper's image and fitting different garments to facilitate the shopper's selection of a correctly sized garment. The image 306 of the shopper 302 is captured by an imaging device 304 such as a camera in a retail outlet or a smartphone or a laptop computer. The imaging module 102 receives image 306 and the object manipulation module 106 facilitates selection of garment 310 based on the user input as decoded or interpreted by the command module 130. The image generation module 108 generates image 320 and transmits it to a display associated with the user device 110 to be shown to the shopper 302. Based on the image 320, the shopper 302 is able to determine that the garment 310 is too large and hence can request the shopping system 100 to automatically fit the selected garment to the proportions in the image 306. In this embodiment, the user instruction module 222 can determine whether the shopper 302 is appropriately positioned within the imaging area 140 of the user interface 120. If it is determined that the shopper is not correctly positioned within the imaging area 140, the user instruction module 222 can provide instructions to the shopper 302 to be positioned within the imaging area 140. If it is determined that the shopper 302 is optimally positioned, the proportion determination module 224 determines the proportions of the shopper and selects another garment 312 with similar design as 310 but of a smaller size. The optimum size for given proportions of the shopper 302 can be selected by comparing the shopper's 302 proportions with the metadata of the representations of the wearable objects stored for example, in the data store 140. The image generation module 108 generates a different image 330 based on the newly selected garment 312 and transmits the image 330 for display to the shopper 302. Hence, the shopping system 100 facilitates automatic size selection of wearable objects without the users having to physically try them on.

Figure 4:
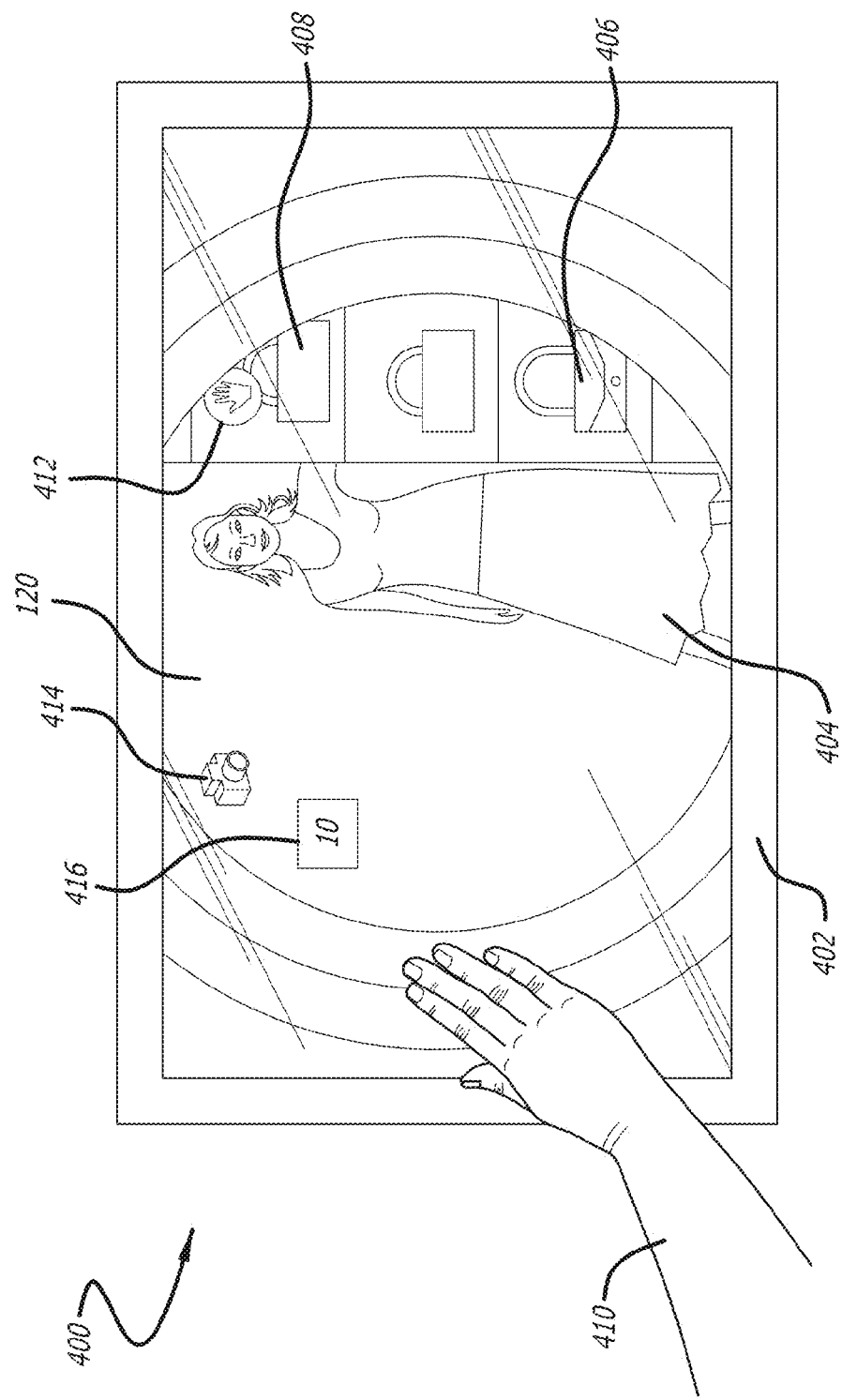
FIG. 4 shows a schematic diagram of a user interface in accordance with an embodiment.

FIG. 4 shows a schematic diagram 400 of a user interface 120 in accordance with an embodiment. In accordance with this embodiment, the user device 110 accessing the shopping system 100 is located in a physical store or a user's home and includes a depth sensor. It allows users to try out and shop for items that may not be available, for example, in the physical store. The user device 110 in accordance with this embodiment comprises a display device 402 on which the user interface 120 is rendered for display to the shopper 410. The user interface 120 comprises an imaging area 140 that displays a received image 404 of the shopper 410. The user interface 120 in this embodiment also comprises a product/object display area 406 which displays wearable objects for selection by the shopper 410. In an embodiment, the display device 402 can be connected to a website of the vendor that populates the product display area with various objects based on the shopper's 410 selection which in this case comprises handbags.

The user device 110 of this embodiment also includes sensors (not shown) that sense depth and motion of the shopper 410 and hence the exact position of the shopper 410 in front of the display device 402 can be determined by the imaging module 102. The sensors can also be configured to determine or sense the outline of the shopper's 410 body so that if needed, the proportion determination module 224 may determine the various proportions of the shopper 410. However, in this case it is not necessary as the shopper 410 is shopping for handbags. The user interface 110 is a perceptual user interface and hence various gestures can be defined or mapped to different shopping behaviors. In FIG. 4 the shopper's 410 hand is near the select icon 412 indicating the shopper's 410 intention to select handbag 408. Based on behavior predefined in the gesture command module 264, the shopper 410 can swing left and swing right to select the product 408 or the shopper 410 can swing down to enter a virtual dressing room which will show a combined image of the handbag 408 with that of the shopper 410. Similarly, the shopper 410 can select the camera icon 414 to have her image taken or the shopper 410 can select the handbag 408 and then select the shopping bag icon 416 to add the selected handbag 408 to the shopping bag for checkout. Thereby the shopper 410 is able to determine how the handbag 408 will look with her current outfit even if the handbag 408 is physically unavailable at the outlet where she maybe shopping.

In an embodiment, the gesture-controlled user interface 120 of the shopping system 100 can be accessed from a shopper's home. A user device 110 that includes the shopper's television and position/motion detecting sensors that are normally included in popular gaming platforms such as for example, KINECT or PLAYSTATION EYE can be used to implement the gesture controlled user interface 120 described in FIG. 4 at a shopper's home. The shopping system 100 can be accessed via an 'app' that are available on televisions which can then harness the functionality of an associated gaming platform connected to the television to implement embodiments described herein.

Figure 5:
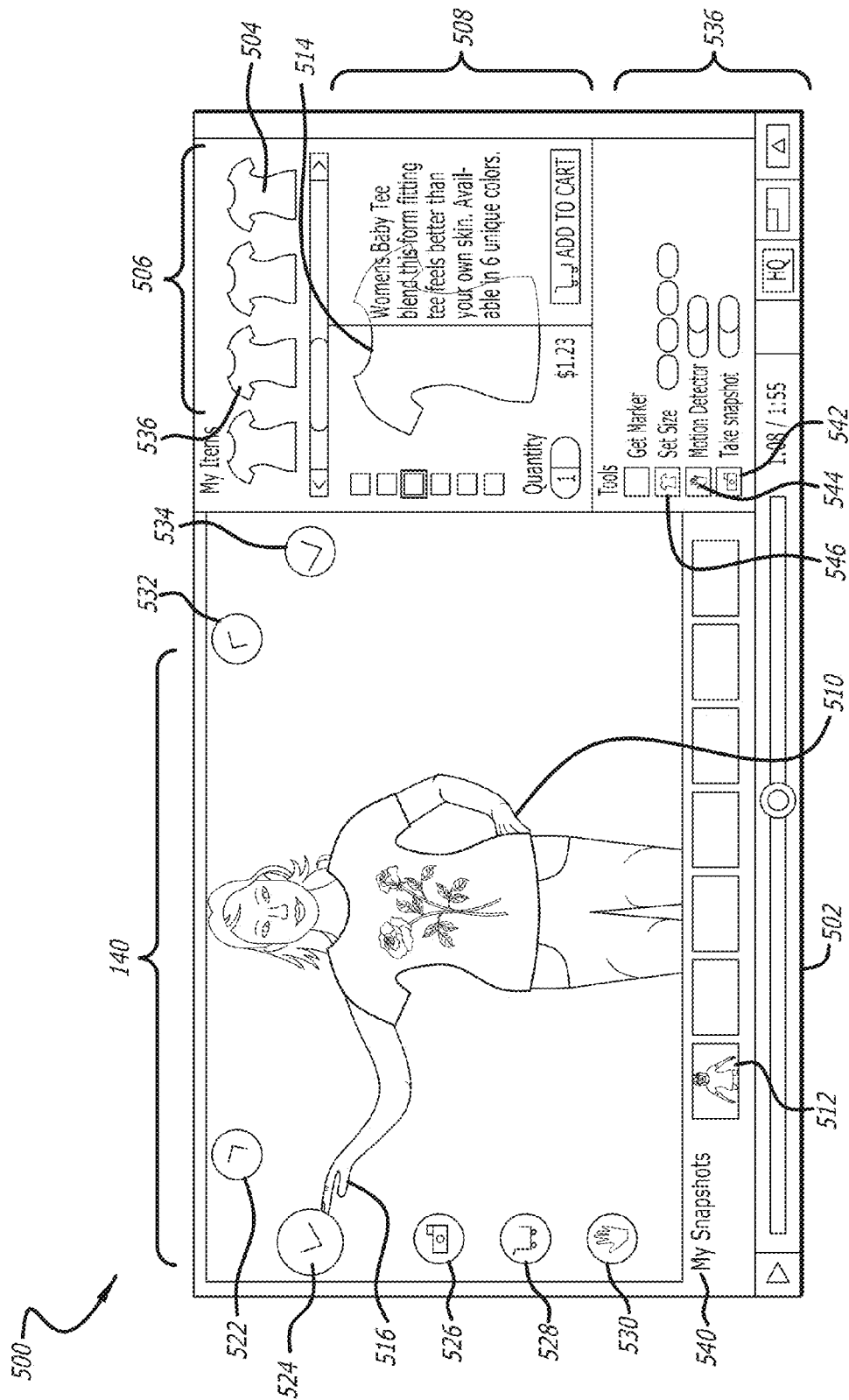
FIG. 5 shows a schematic diagram of the user interface in accordance with an embodiment.

FIG. 5 shows a schematic diagram 500 of the user interface 120 in accordance with an embodiment. In this embodiment a shopper 510 accesses the shopping system 100 by rendering the user interface 120 on a device such as a tablet, a laptop or a desktop. The user interface 120 comprises a video player 502 that receives a video of the shopper 510 from an imaging source such as a camera that may be present on the device accessing the user interface 120. The video player 502 is divided into an imaging area 140 that shows the video of the shopper 510 and a product display area 506 that displays the various products or wearable objects 504 for user selection. The product display area 506 further comprises a selected product display area 508 wherein a particular product 514 selected by the shopper 510 is displayed along with its description, price and interface controls to select a specific number of quantities to add to the shopping cart. As seen from FIG. 5, three-dimensional models of the t-shirts 504 are displayed in the product display area 506 rather than two-dimensional images. Hence, the image generation module 108 can be configured to produce a combined image of the shopper 510 wearing a selected t-shirt 508 displayed in the imaging area 140 of the video player 502. As mentioned supra, the shopping system 100 not only receives images in real-time but can also receive stored images and fit wearable objects to such stored images. Accordingly, the imaging area 140 also displays additional images 512 that are available for user selection in the "My Snapshots" area of the video player 502.

The user interface 120 as shown in FIG. 5 includes various icons that facilitate user navigation between various wearable objects or items presented by the shopping system 100. The icons can be activated via various hardware based inputs such as keyboard input, mouse clicks or gesture based inputs as described herein with respect to FIG. 4. Following presents a brief, non-limiting description of the icons shown in the imaging area 140. It may be appreciated that more or less number of icons with different functionality can be incorporated into the user interface 120 in accordance with embodiments described herein. Icons 522 and 524 provide for user navigation between the various wearable items 504 presented for the shopper's 510 inspection. As seen from the selected product display area 508 and the combined image presented in the imaging area 140, the shopper 510 is currently trying out the blue t-shirt 514. In FIG. 5 the shopper's hand 516 is in proximity to the icon 524 which facilitates the shopper 510 to navigate to the next wearable object 536 in the set of wearable objects 508. Icon 526 facilitates the shopper 510 to capture a different image for uploading to the shopping system 100. Icon 528 facilitates the shopper 510 to add a selected product, for example, the blue t-shirt 514 to the shopping cart for check out. Icon 530 is an icon that facilitates the shopper 510 to select desired objects and icons 532 and 534 facilitate selection of other styles.

The user interface 120 also includes a tools area 536 which provides different tools that enable the shopper 510 to request automatic fitting of a selected product 514 by the wearable objects module 102 of the shopping system 100. When the shopper 510 initially accesses the user interface 120 and selects the items of her choice 504, she can activate the motion detection control 544 in order to upload her image with the depth information to the shopping system 100. Subsequently she can select the blue t-shirt 514 to try it out. In response to the shopper's selection, the shopping system 100 detects the proportions of the shopper 510, determines the particular size of the blue t-shirt 514 that best fits the shopper 510 and automatically generates the image shown in imaging area 140. In an embodiment, the shopping system 100 determines the best fit based on a metadata associated with each size and stored with the related plurality of items in, for example, the data storage 104. Therefore, for each size of a wearable object there can be metadata defined that facilitates the shopping system 100 to determine the whether the wearable object fits the body of a wearer in a manner intended by a designer of the wearable object. For example, metadata defined for the selected t-shirt 514 can comprise ranges of shoulder width, torso length and girth and other measurements that can be compared by the shopping system 100 to corresponding body dimensions of the shopper 510 and determine if the t-shirt 514 will fit the shopper 510. The shopping system 100 thereby facilitates automatically fitting selected garments to the shoppers saving them time and effort to visit retail outlets to try out different sizes or mitigates the need for shoppers to gain knowledge of the optimum size prior to purchasing wearable objects through eCommerce websites.

If the shopper 510 is satisfied with a particular image and desires to store the image for future use, she can activate the take snapshot control 542 for the shopping system to obtain the snapshot of the shopper 510 and store it thereby mitigating the need for the shopper 510 to activate an imaging component of the user device 110 each time the shopper 510 wishes to shop with the shopping system 100. In an embodiment, such snapshots can have associated therewith user provided metadata that can identify an entity featured in the snapshot. The previously obtained snapshots can be displayed in the "My Snapshots" area 540 for selection and use by the shopper 510. The set size control 546 in the tools area facilitates the shopper 510 to lock in a particular desired size or otherwise turns off the automatic fitting function of the shopping system 100.

Figure 6:
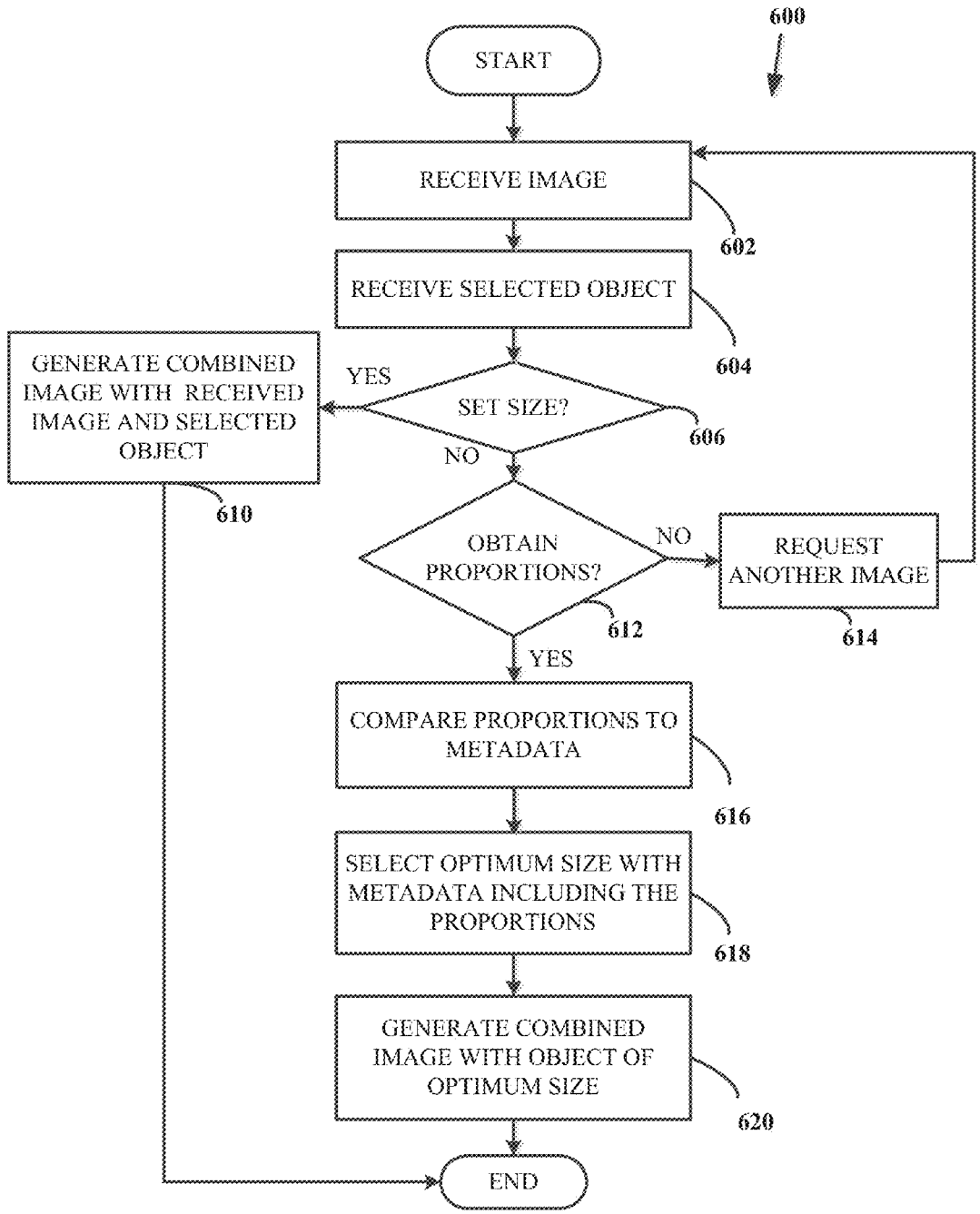
FIG. 6 shows a flowchart detailing a method of shopping and obtaining the right fit of wearable objects in accordance with an embodiment.

FIG. 6 shows a flowchart 600 detailing a method of shopping and obtaining the right fit of wearable objects in accordance with an embodiment. The method commences with the imaging module 102 of the shopping system 100 receiving (602) an image comprising depth information from a shopper. In an embodiment, the image can be a moving image such as a video of a user. The shopping system 100 also receives (604) a shopper selection of a particular wearable object to fit to the user in the received image. The shopping system 100 determines (606) if the shopper requested to set a particular size. In an embodiment, the shopper can request the shopping system 100 to use a particular size instead of automatically fitting selected wearable objects. If the shopper has requested to use a set size, a combined image of the user with the selected wearable object in the selected size is generated (610) for display to the shopper on a display screen of a user device 110. If the shopper has not set a size, the imaging module 102 obtains (612) the proportions such as height, waist, shoulder width or other information needed to determine the size of the wearable object. In an embodiment, the proportion information that is obtained can depend on the type of the wearable object that needs to be fitted. Thus, the proportion information obtained to fit a shirt would be different from the proportion information obtained to fit a pant. In an embodiment, if the proportions of the user in the received image cannot be determined, the user instruction module 222 can request (614) the shopper to load a particular image based on the type of wearable object selected for fitting and the method returns to receiving (602) an uploaded image. If the proportions are obtained, then the proportions are compared (616) to metadata associated with each size of the wearable object as described supra. The size whose metadata includes a range of measurements that cover the proportions is selected (618) as the optimum size for the proportions and a combined image of the optimum sized wearable object with the user in the received image is generated (620) for display to the shopper. In an embodiment, the metadata can include a plurality of measurement ranges and one or more of the proportions of the subject need to be covered by the ranges in order that a particular size is selected as an optimal size.

Figure 7:
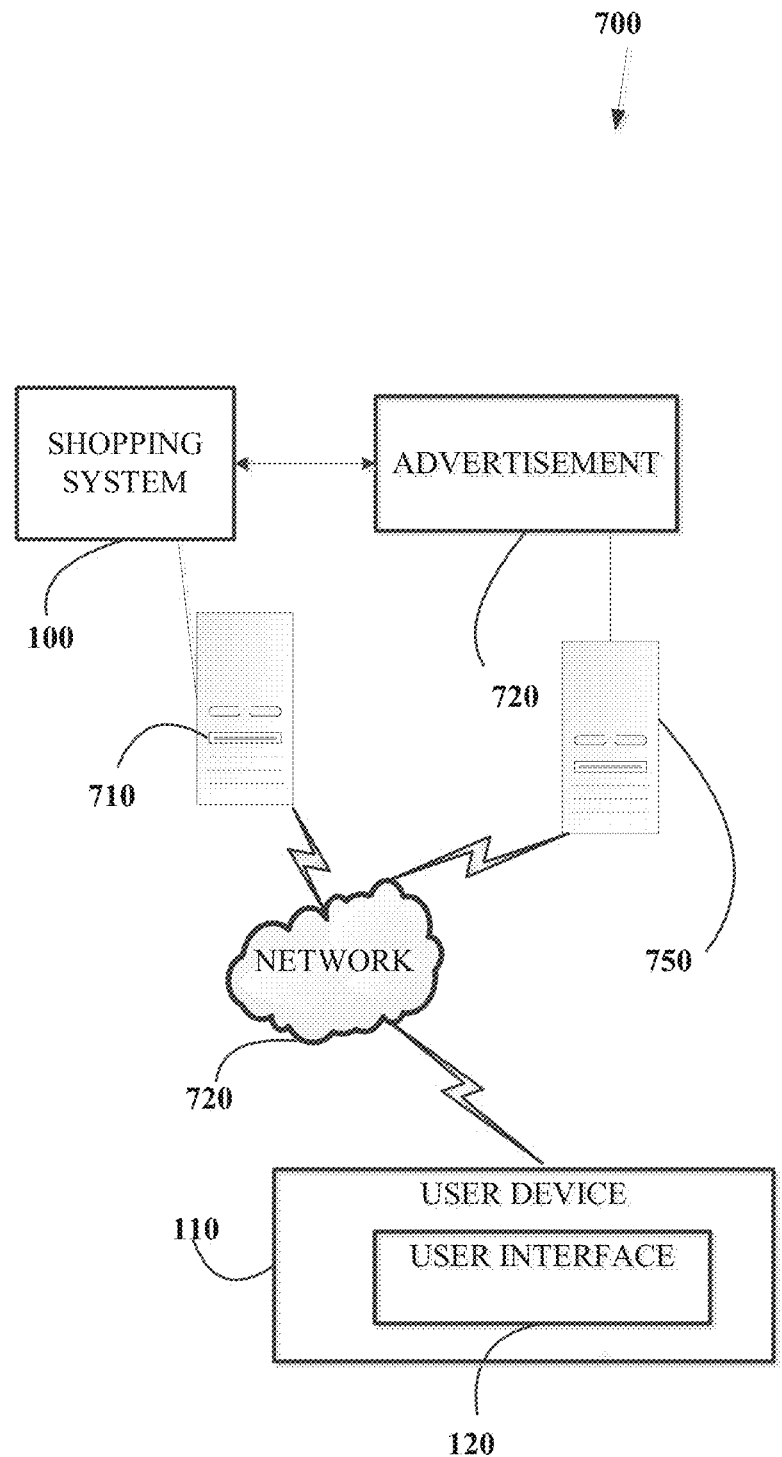
FIG. 7 illustrates a schematic diagram of a system for generating and displaying combined images of selected wearable objects and users in accordance with embodiments described herein.

FIG. 7 illustrates a schematic diagram of a system 700 for generating and displaying combined images of selected wearable objects and users in accordance with embodiments described herein. The system 700 includes a client/user device 110 employed by a shopper for accessing the shopping system 100 via its user interface 120. The user device 110 transmits a request for access to the shopping system 100 via a network 720, such as one or more of the Internet or a cellular network, to a server 710. It may be appreciated that only one user device 110 is shown for illustrative purposes and that any number of devices can be accessing the shopping system 100. The server 710 that hosts the shopping system 100 receives the request and transmits the webpage or user interface 120 for display at the user device 110. The user interface 120 facilitates the various interactions of the shopper with the shopping system 100. In an embodiment, the user interface 120 can also include one or more advertisements 720 retrieved from an ad-server 750.

Figure 8:
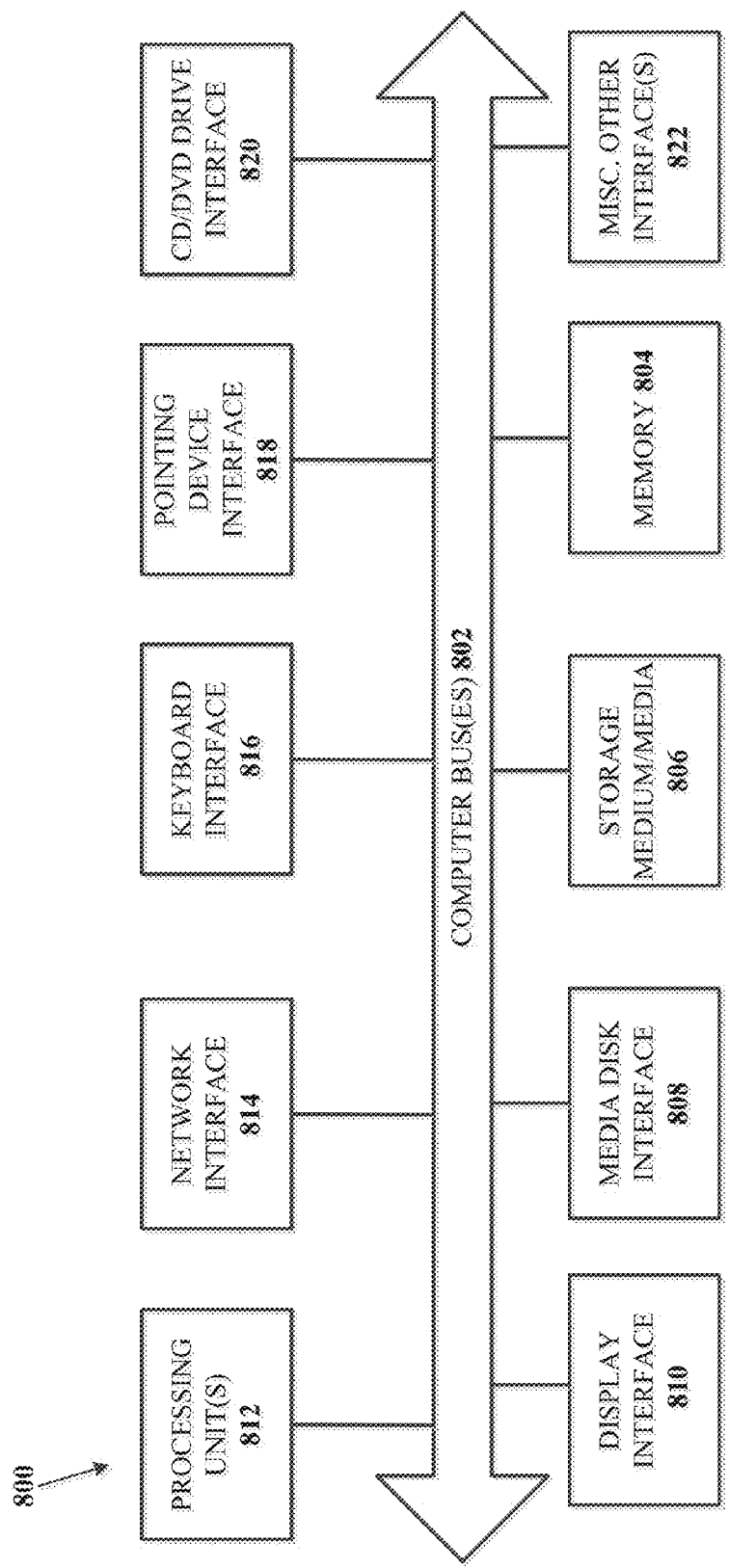
FIG. 8 illustrates internal architecture of a computing device in accordance with embodiments described herein.

As shown in the example of FIG. 8, internal architecture of a computing device 800 includes one or more processing units (also referred to herein as CPUs) 812, which interface with at least one computer bus 802. Also interfacing with computer bus 802 are persistent storage medium/media 806, network interface 814, memory 804, e.g., random access memory (RAM), run-time transient memory, read only memory (ROM), etc., media disk drive interface 808, an interface 820 for a drive that can read and/or write to media including removable media such as floppy, CD-ROM, DVD, etc., media, display interface 810 as interface for a monitor or other display device, keyboard interface 816 as interface for a keyboard, pointing device interface 818 as an interface for a mouse or other pointing device, and miscellaneous other interfaces 822 not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code or logic, and/or computer-executable process steps, incorporating functionality described herein, e.g., one or more of process flows described herein. CPU 812 first loads computer-executable process steps or logic from storage, e.g., memory 804, storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, web pages, content files, metadata, playlists and other files. Persistent storage medium/media 806 can further include program modules and data files used to implement one or more embodiments of the present disclosure.

Figure 9:
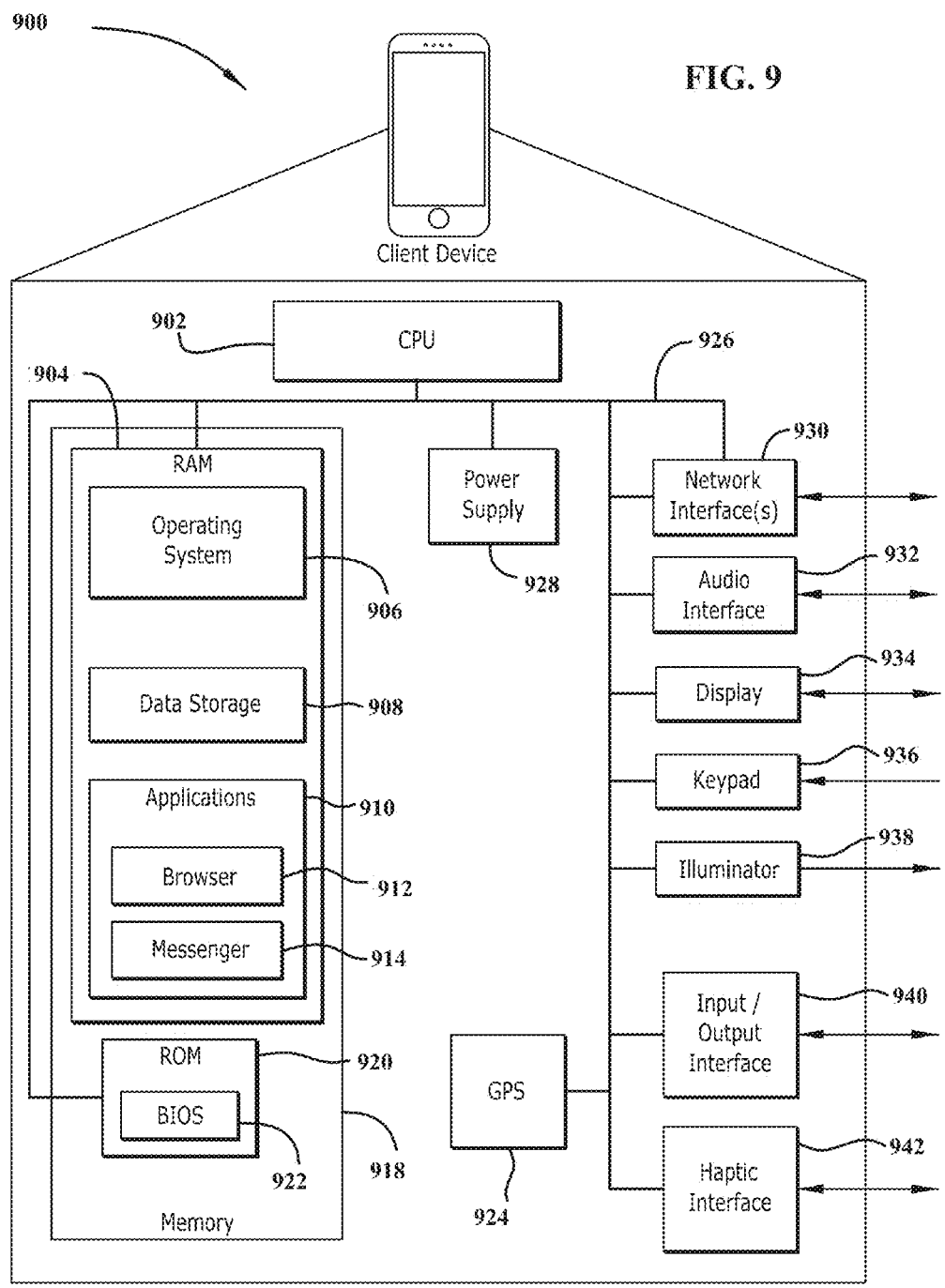
FIG. 9 is a schematic diagram illustrating a client device implementation of a computing device in accordance with embodiments of the present disclosure.

FIG. 9 is a schematic diagram illustrating a client device implementation of a computing device in accordance with embodiments of the present disclosure. A client device 900 may include a computing device capable of sending or receiving signals, such as via a wired or a wireless network, and capable of running application software or "apps". A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 902, power supply 928, a memory 918, ROM 920, BIOS 922, network interface(s) 930, audio interface 932, display 934, keypad 936, illuminator 938, I/O interface 940 interconnected via circuitry 926. Claimed subject matter is intended to cover a wide range of potential variations. For example, the keypad 936 of a cell phone may include a numeric keypad or a display 934 of limited functionality, such as a monochrome liquid crystal display (LCD) for displaying text. In contrast, however, as another example, a web-enabled client device 900 may include one or more physical or virtual keyboards 936, mass storage, one or more accelerometers, one or more gyroscopes, global positioning system (GPS) 924 or other location identifying type capability, Haptic interface 942, or a display with a high degree of functionality, such as a touch-sensitive color 2D or 3D display, for example. The memory 918 can include Random Access Memory 904 including an area for data storage 908.

A client device 900 may include or may execute a variety of operating systems 906, including a personal computer operating system, such as a Windows, iOS or Linux, or a mobile operating system, such as iOS, Android, or Windows Mobile, or the like. A client device 900 may include or may execute a variety of possible applications 910, such as a client software application 914 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 900 may also include or execute an application to communicate content, such as, for example, textual content, multimedia content, or the like. A client device 900 may also include or execute an application 912 to perform a variety of possible tasks, such as browsing, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, by a processor, a first image of a subject, the first image comprising an entity that forms a portion of a subject's body;
   determining, by the processor, proportions of the portion of the subject's body based on the entity in the first image;
   receiving, by the processor, a user selection of a wearable object from a plurality of wearable objects, each of the wearable objects having a respective size indicative of respective physical dimensions, the user selection comprising a gesture;
   retrieving, by the processor, a graphical representation of the wearable object having a size corresponding to the physical dimensions of the wearable object, the retrieving further comprising selecting, by the processor, the size as an optimum size for the subject, the optimum size selected based on the proportions of the subject's body from a plurality of sizes that comprise the size and other sizes alternately available for the wearable object, the selecting of the optimum size further comprising comparing, by the processor, the proportions of the subject's body with metadata associated with the plurality of sizes and selecting, by the processor, from the plurality of sizes, a size that has respective metadata with measurement ranges including the proportions as the optimum size;
   receiving, by the processor, a voice command;
   decoding, by the processor, the voice command to extract an instruction to show a second image;
   generating, by the processor, in response to the decoded voice command, the second image by combining the first image and the graphical representation, said second image showing the user selected wearable object on the subject's body, such that the user selected wearable object's physical dimensions are depicted in accordance with the proportions of the subject's body; and
   communicating, by the processor, the second image for display to the user.

2. The method of claim 1, further comprising:
   transmitting, by the processor, information regarding the plurality of wearable objects for display to the user to facilitate the user selection.

3. The method of claim 1, wherein the first image is retrieved by the processor from a processor readable storage medium.

4. The method of claim 1, wherein the first image is received by the processor in real-time from an imaging device.

5. The method of claim 1, wherein the user is the subject.

6. The method of claim 1, wherein the size is selected by the user.

7. The method of claim 6, further comprising:
   receiving, by the processor, a request to determine an optimum size for the user selected wearable object;
   accessing, by the processor, metadata associated with a plurality of sizes that define respective dimensions available for the user selected wearable object; and
   comparing, by the processor, the proportions of the subject to the metadata associated with each of the plurality of sizes.

8. The method of claim 7, further comprising:
   selecting, by the processor, from the plurality of sizes, a size different from the size that has respective metadata with measurement ranges including the proportions as the optimum size; and
   generating, by the processor, a third image that shows the selected wearable object of the optimum size on the subject's body in accordance with the proportions of the subject's body and the physical dimensions of the selected wearable object by combining the first image with the graphical representation of the wearable selected object having the optimum size; and
   transmitting, by the processor, the third image for display to the user.

9. A computing device comprising:
   a processor;
   a non-transitory computer-readable storage medium for tangibly storing thereon program logic for execution by the processor, the program logic comprising:
   image receiving logic, executed by the processor, for receiving a first image of a subject, the first image comprising an entity that forms a portion of a subject's body;
   determining logic, executed by the processor, for determining proportions of the portion of the subject's body based on the entity in the first image;

selected wearable objects receiving logic, executed by the processor, for receiving a user selection of a wearable object from a plurality of wearable objects, each of the wearable objects having a size indicative of respective physical dimensions, the user selection comprising a gesture;

graphical representation retrieving logic, executed by the processor, for retrieving a graphical representation of the wearable object having a size corresponding to respective physical dimensions, the graphical representation retrieving logic further comprising size selecting logic executed by the processor for selecting the size as an optimum size for the subject, the optimum size selected based on the proportions of the subject's body from a plurality of sizes that comprise the size and other sizes alternately available for the wearable object, the selecting of the optimum size further comprising comparing, by the processor, the proportions of the subject's body with metadata associated with the plurality of sizes and selecting, by the processor, from the plurality of sizes, a size that has respective metadata with measurement ranges including the proportions as the optimum size;

voice command receiving logic executed by the processor for receiving a voice command;

voice command decoding logic executed by the processor for decoding the voice command to extract an instruction to show a second image;

image generating logic, executed by the processor, for generating, in response to the decoded voice command, the second image by combining the first image and the graphical representation, said second image showing the user selected wearable object on the subject's body, such that the user selected wearable object's physical dimensions are depicted in accordance with the proportions of the subject's body;

image communication logic, executed by the processor, for transmitting the second image for display to the user.

10. The computing device of claim 9, further comprising:
wearable objects transmitting logic, executed by the processor, for transmitting information regarding the plurality of wearable objects for display to the user to facilitate the user selection.

11. The computing device of claim 9 wherein the size selecting further comprises:
comparing logic, by the processor, for comparing the proportions of the subject's body with metadata associated with the plurality of sizes.

12. The computing device of claim 9 wherein the user is the subject.

13. A non-transitory computer readable storage medium, comprising instructions, which when executed by a processor cause the processor to:
receive a first image of a subject, the first image comprising an entity that forms a portion of the subject's body;
determine proportions of the portion of the subject's body based on the entity in the first image;
receive a user selection of a wearable object from a plurality of wearable objects, each of the wearable objects having a respective size indicative of respective physical dimensions, the user selection comprising a gesture;
retrieve a graphical representation of the wearable object having a size corresponding to the physical dimensions of the wearable object, the retrieving further comprising selecting the size as an optimum size for the subject, the optimum size selected based on the proportions of the subject's body from a plurality of sizes that comprise the size and other sizes alternately available for the wearable object, the selecting of the optimum size further comprising comparing the proportions of the subject's body with metadata associated with the plurality of sizes and selecting, from the plurality of sizes, a size that has respective metadata with measurement ranges including the proportions as the optimum size;
receive a voice command;
decode the voice command to extract an instruction to show a second image;
generate, in response to the decoded voice command, the second image by combining the first image and the graphical representation, said second image showing the user selected wearable object on the subject's body, such that the user selected wearable object's physical dimensions are depicted in accordance with the proportions of the subject's body;
communicate the second image for display to the user.

14. The non-transitory computer readable storage medium of claim 13, further comprising instructions which when executed by a processor, cause the processor to:
transmit information regarding the plurality of wearable objects for display to the user to facilitate the user selection.

* * * * *